(12) United States Patent
Sakimoto et al.

(10) Patent No.: US 11,577,430 B2
(45) Date of Patent: Feb. 14, 2023

(54) SORTING METHOD

(71) Applicant: UBE INDUSTRIES, LTD., Ube (JP)

(72) Inventors: Ryo Sakimoto, Sodegaura (JP); Takuya Shimofusa, Osaka (JP); Shoichi Yamaoka, Shimonoseki (JP); Hidenobu Kuwahara, Ube (JP)

(73) Assignee: UBE INDUSTRIES, LTD., Ube (JP)

( * ) Notice: Subject to any disclaimer, the term of this patent is extended or adjusted under 35 U.S.C. 154(b) by 104 days.

(21) Appl. No.: 16/912,451

(22) Filed: Jun. 25, 2020

(65) Prior Publication Data

US 2020/0324438 A1 Oct. 15, 2020

Related U.S. Application Data

(63) Continuation of application No. 15/751,046, filed as application No. PCT/JP2016/073510 on Aug. 10, 2016, now abandoned.

(30) Foreign Application Priority Data

Aug. 12, 2015 (JP) .................................. 2015-159421
Oct. 23, 2015 (JP) .................................. 2015-208952

(51) Int. Cl.
*B29B 9/16* (2006.01)
*H01G 11/52* (2013.01)
(Continued)

(52) U.S. Cl.
CPC ................. *B29B 9/16* (2013.01); *B32B 5/32* (2013.01); *C08J 5/18* (2013.01); *C08L 23/06* (2013.01); *C08L 23/12* (2013.01); *H01G 11/52* (2013.01); *H01M 50/411* (2021.01); *H01M 50/446* (2021.01); *B29B 9/06* (2013.01); *B29B 9/065* (2013.01); *B29B 2009/166* (2013.01); *B29B 2009/168* (2013.01); *C08J 2323/06* (2013.01); *C08J 2323/12* (2013.01); *C08L 2203/16* (2013.01)

(58) Field of Classification Search
None
See application file for complete search history.

(56) References Cited

U.S. PATENT DOCUMENTS

| | | |
|---|---|---|
| 8,951,456 B2 | 2/2015 | Uehara et al. |
| 2002/0033124 A1 | 3/2002 | Asanuma et al. |

(Continued)

FOREIGN PATENT DOCUMENTS

| | | |
|---|---|---|
| CN | 1784272 A | 6/2006 |
| CN | 203210556 U | 9/2013 |

(Continued)

OTHER PUBLICATIONS

Partial English translation of JP 2001-122985, May 8, 2001, Japan.*

(Continued)

*Primary Examiner* — Tae H Yoon
(74) *Attorney, Agent, or Firm* — Knobbe, Martens, Olson & Bear LLP

(57) ABSTRACT

A resin granule mass including a plurality of resin granules, and a proportion of resin granules to which a magnetic foreign matter of 50 μm or greater is adhered in the plurality of resin granules is 30% or less.

11 Claims, 4 Drawing Sheets

(51) Int. Cl.
*C08J 5/18* (2006.01)
*B32B 5/32* (2006.01)
*C08L 23/06* (2006.01)
*C08L 23/12* (2006.01)
*H01M 50/411* (2021.01)
*H01M 50/446* (2021.01)
*B29B 9/06* (2006.01)

(56) References Cited

U.S. PATENT DOCUMENTS

2012/0245257 A1\* 9/2012 Fascio ............... B29B 17/0036
524/35
2012/0309925 A1 12/2012 Kondo et al.

FOREIGN PATENT DOCUMENTS

| CN | 204093560 U | \* | 1/2015 |
|---|---|---|---|
| CN | 104736249 A | | 6/2015 |
| JP | A-04-074546 | | 3/1992 |
| JP | A-2000-136289 | | 5/2000 |
| JP | A-2000-313745 | | 11/2000 |
| JP | 2001-122985 | \* | 5/2001 |
| JP | A-2001-122985 | | 5/2001 |
| JP | A-2001-138321 | | 5/2001 |
| JP | A-2003-002981 | | 1/2003 |
| JP | A-2004-009005 | | 1/2004 |
| JP | A-2005-021761 | | 1/2005 |
| JP | A-2005-067174 | | 3/2005 |
| JP | A-2011-218292 | | 11/2011 |
| JP | A-2012-000575 | | 1/2012 |
| JP | 2015-040284 A | | 3/2015 |
| WO | WO 2011/105504 A1 | | 9/2011 |

OTHER PUBLICATIONS

International Search Report in International Application No. PCT/JP2016/073510, dated Nov. 8, 2016.
Office Action in Chinese Patent Application No. 201680046768.X dated Feb. 3, 2020.
English abstract of JP 2007-168260 A, Japan, Jul. 5, 2007, 5 pages.
English abstract of WO 2008/143196 A1, WIPO, Nov. 27, 2008, 12 pages.
English abstract JP 2015-040284 A, Japan, Mar. 2, 2015, 5 pages.
Restriction Requirement in U.S. Appl. No. 15/751,046 dated Nov. 29, 2019.
Office Action in U.S. Appl. No. 15/751,046 dated Mar. 25, 2020.
"Solid Waste Treatment and Utilization", Xie Zhifeng, China Radio TV University Press, p. 60-61, Jan. 2014.
Office Action in Chinese Patent Application No. 201680046768.X dated Jul. 20, 2020.

\* cited by examiner

SORTING METHOD

RELATED APPLICATIONS

This application is a continuation of U.S. patent application Ser. No. 15/751,046, filed Feb. 7, 2018, now abandoned, which is the national phase entry under 35 U.S.C. 371 of International Application No. PCT/JP2016/073510, filed Aug. 10, 2016, which claims priority to Japanese Patent Application No. 2015-208952, filed Oct. 23, 2015; and to Japanese Patent Application No. 2015-159421, filed Aug. 12, 2015, the entire contents of which are incorporated herein by reference.

TECHNICAL FIELD

The present invention relates to a resin granule mass, a resin film, a separator, a sorting device, and a sorting method.

BACKGROUND ART

A resin-processed product can be produced using a resin raw material. Resin particles and resin granules are known resin raw materials. Resin pellets or the like of approximately 2 to 3 mm are widely used as resin granules.

Resin pellets can be obtained by any one of the methods described in, for example, Patent Documents 1 to 3.

In the methods described in Patent Documents 1 and 2, a molten resin is extruded in the form of a strand from a strand die and cut by a pelletizer to obtain resin pellets. In the method described in Patent Document 3, a molten resin is extruded from a die in water, and cut and processed using a rotary blade provided near a surface of the die or in contact with the die to obtain resin pellets.

However, in a case where a resin is cut into pellets by a metal cutter such as a rotary blade, a part of the worn blade may adhere to or may be mixed in the resin pellets. The foreign matter which is mixed in and which has a magnetic property such as the mixed metallic foreign matter is called magnetic foreign matter.

The magnetic foreign matter has various sizes from several micrometers to several hundred micrometers. There is a case that a foreign matter has such a size that it is not easily visually distinguished. In a case where magnetic foreign matter adheres to or is mixed in the resin pellets, it affects the quality of a product produced by melt-processing the resin pellets. Therefore, it is necessary to remove the magnetic foreign matter from the resin pellets, or to remove the pellets having the magnetic foreign matter mixed therein from the resin granule mass.

In general, resin pellets are shipped after being packed in a flexible container. Therefore, confirming the presence of magnetic foreign matter for each resin pellet is not efficient and not industrially suitable.

Accordingly, a method of removing magnetic foreign matter from a packed resin granule mass, or a method of removing pellets having magnetic foreign matter mixed therein before packing in a flexible container has been examined. Or, a method of taking a resin granule mass out of a flexible container and removing magnetic foreign matter in using has been examined.

For example, in Patent Document 4, a device is described which is provided with a transport belt which transports resin pellets, a driving roll around which the transport belt is wound and which provides a driving force, and a driven roll which makes a pair with the driving roll and has a magnetic force. The device adsorbs and removes resin pellets having magnetic foreign matter mixed therein by a magnetic force of a magnet roll.

For example, in Patent Document 5, a method is described in which a magnet is disposed so as to satisfy a predetermined condition with respect to a flow path in which resin pellets flow to remove resin pellets having magnetic foreign matter mixed therein.

For example, in Patent Document 6, a method is described in which a transport gas is supplied from below side of the granules to remove a fine powder using a residence time in a device varying by the granules.

For example, in Patent Document 7, a method is described in which an image of falling granular matter is captured to discriminate a defective product using a color difference.

CITATION LIST

Patent Document

[Patent Document 1] Japanese Unexamined Patent Application, First Publication No. 2000-313745
[Patent Document 2] Japanese Unexamined Patent Application, First Publication No. 2001-138321
[Patent Document 3] Japanese Unexamined Patent Application, First Publication No. 2005-067174
[Patent Document 4] Japanese Unexamined Patent Application, First Publication No. H04-74546
[Patent Document 5] Japanese Unexamined Patent Application, First Publication No. 2003-002981
[Patent Document 6] Japanese Unexamined Patent Application, First Publication No. 2011-218292
[Patent Document 7] Japanese Unexamined Patent Application, First Publication No. 2012-000575

SUMMARY OF INVENTION

Technical Problem

However, it was not possible to sufficiently remove magnetic foreign matter adhering to or mixed in a resin granule mass even using any of the devices of Patent Documents 4 to 7.

For example, the device described in Patent Document 4 can remove only magnetic foreign matter of 400 µm or greater, and the device described in Patent Document 5 can remove only magnetic foreign matter of 300 µm or greater. In the device described in Patent Document 6, resin pellets are rubbed against each other during the course of transporting granules, and thus there is a concern that magnetic foreign matter may re-adhere again due to generated static electricity. Furthermore, the device described in Patent Document 7 has a limit on discrimination of foreign matter having a several hundred micrometer-order size due to the resolution of a detector.

Accordingly, in these devices, it was difficult to sufficiently remove fine magnetic foreign matter of 100 µm or less. In addition, it was not possible to avoid the re-adhesion of fine magnetic foreign matter due to static electricity or the like.

That is, there is a problem in that the proportion of defective products having magnetic foreign matter adhering thereto or mixed therein in a resin granule mass included in a flexible container increases. In addition, in a case where a product is processed using such resin pellets having fine magnetic foreign matter adhering thereto or mixed therein, the quality of products (resin films or the like) manufactured may be affected.

For example, a separator film is used in an electric storage device such as a lithium ion secondary battery or a lithium ion capacitor. In a case where conductive foreign matter is mixed in the separator film, a short circuit occurs, and in the worst case, an extremely severe problem such as ignition may occur. These electric storage devices are also used for vehicles, and a required level of magnetic foreign matter management is increased.

The invention is contrived in view of the above circumstances, and an object thereof is to provide a sorting device capable of removing fine magnetic foreign matter from resin granules, or which sorts resin granules having magnetic foreign matter mixed therein from a resin granule mass. Another object thereof is to obtain a resin granule mass ensuring a high yield rate by using the sorting device. A further object thereof is to obtain a high-quality battery separator film for a lithium ion secondary battery from the resin granule mass ensuring a high yield rate.

Solution to Problem

The present invention provides the following means for solving the above problems.

(1) A resin granule mass according to a first aspect is a resin granule mass including: a plurality of resin granules in which a proportion of resin granules to which a magnetic foreign matter of 50 μm or greater is adhered in the plurality of resin granules is 30% or less.

(2) In the resin granule mass according to the aspect, the resin granules may include a polyolefin resin.

(3) In the resin granule mass according to the aspect, the polyolefin resin may be a polyethylene or a polypropylene.

(4) A resin film according to a first aspect is a resin film which is obtained from the resin granule mass according to the aspect, in which a detecting ratio of the magnetic foreign matter of 50 μm or greater is 140 mm$^2$ or less per 1 m$^2$ in terms of a thickness of 10 μm.

(5) A separator according to a first aspect includes: the resin film according to the aspect.

(6) In the separator according to the aspect, a detecting ratio of the magnetic foreign matter of 50 μm or greater may be 170 mm$^2$ or less per 1 m$^2$ in terms of a thickness of 20 μm.

(7) A sorting device according to a first aspect includes: a transport path which is configured to transport resin granules, a destaticizer which is disposed along the transport path and which supplies ions to the transport path to destaticize the resin granules, and an adsorption magnet which is disposed along the transport path on the downstream side than the destaticizer and which forms a magnetic field in the transport path to adsorb a magnetic foreign matter.

(8) The sorting device according to the aspect may further include: a magnetization magnet which is disposed along the transport path on the upstream side than the adsorption magnet and which forms a magnetic field in the transport path to magnetize a magnetic foreign matter included in the resin granules.

(9) In the sorting device according to the aspect, the destaticizer may be disposed on the downstream side than the magnetization magnet.

(10) In the sorting device according to the aspect, a magnetic flux density of the adsorption magnet may be the same as or greater than a magnetic flux density of the magnetization magnet.

(11) In the sorting device according to the aspect, the transport path may have a moving control function that can move the resin granules at a substantially constant amount per unit time.

(12) In the sorting device according to the aspect, the adsorption magnet may extend in a width direction substantially perpendicular to a transport direction of the transport path to form a substantially uniform magnetic field in the width direction.

(13) In the sorting device according to the aspect, the transport path may form an inclined plane, and the adsorption magnet may adsorb the magnetic foreign matter when the resin granules flow down the inclined plane.

(14) In the sorting device according to the aspect, the transport path may vertically extend, and the adsorption magnet may adsorb the magnetic foreign matter when the resin granules fall in the transport path.

(15) A sorting method according to a first aspect is performed using the sorting device according to the aspect.

(16) In the sorting method according to the aspect, a wind pressure of air containing ions supplied from the destaticizer in the sorting device may be 0.5 MPa or less.

Advantageous Effects of Invention

According to the sorting device of the aspect, it is possible to remove a foreign matter-adhering product (defective product) having magnetic foreign matter adhering thereto or mixed therein in a resin granule mass. In addition, it is possible to obtain a high-quality resin film using the resin granule mass with few foreign matter-adhering products.

DETAILED DESCRIPTION OF THE EMBODIMENTS

Figure 1:
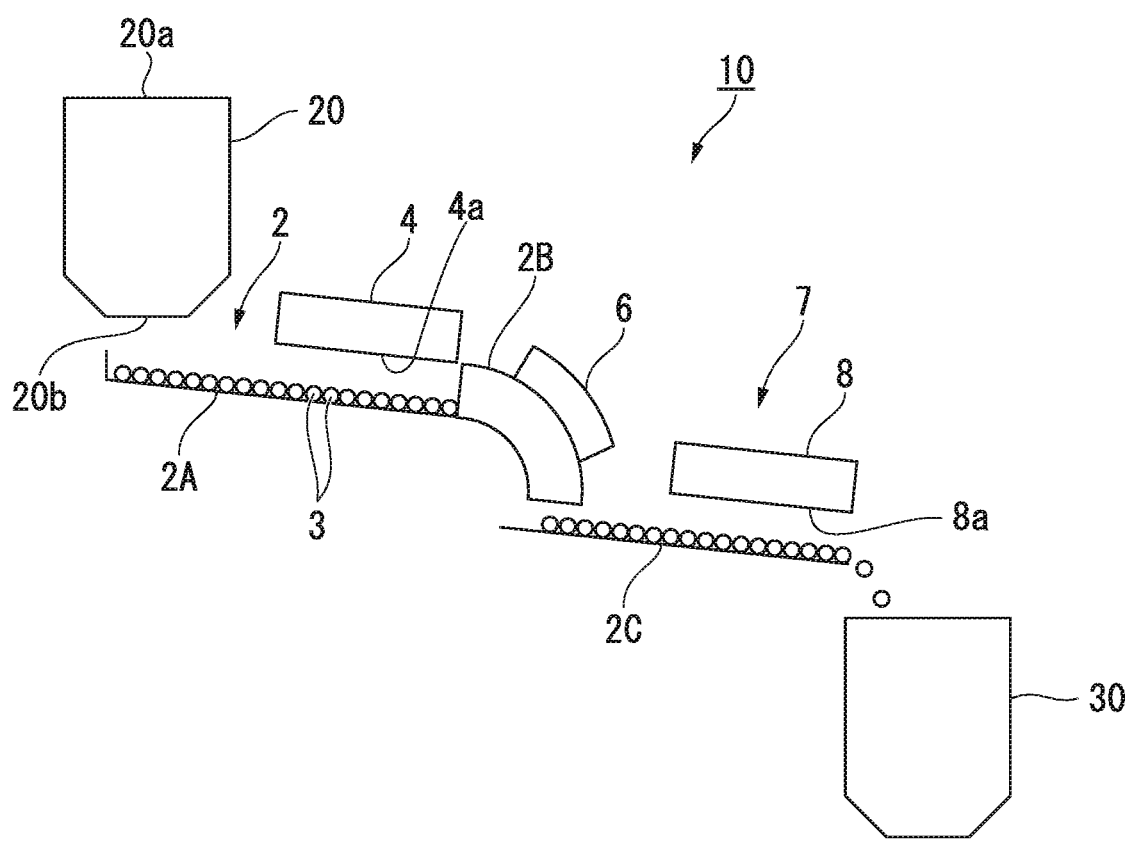
FIG. 1 is a schematic diagram of a sorting device according to a first embodiment of the invention.

Hereinafter, embodiments will be described in detail with appropriate reference to the drawings. In the drawings used in the following description, characteristic portions may be illustrated in an enlarged manner for convenience in order to make it easy to understand the characteristics of the invention, and dimensional ratios or the like of the constituent elements may differ from the actual ones. The materials, dimensions, and the like exemplified in the following description are just an example, and can be appropriately changed without departing from the gist of the invention.

Sorting Device

First Embodiment

FIG. 1 is a schematic diagram of a sorting device according to a first embodiment.

As illustrated in FIG. 1, a sorting device 10 has a transport path 2, a magnetization magnet (hereinafter, referred to as a first magnet) 4, a destaticizer 6, and a adsorption magnet (hereinafter, referred to as a second magnet) 8. A raw material hopper 20 is disposed on one end side of the sorting device 10, and a temporary storage hopper 30 on the processing device side is disposed on the other end side.

The raw material hopper 20 has an opening 20a at one end and a discharge port 20b at the other end side. The temporary storage hopper 30 stores resin granules passing through the sorting device 10. A flexible container is an example of the temporary storage hopper 30. A processing device may be provided instead of the temporary storage hopper 30. Hereinafter, the side on which the raw material hopper 20 is disposed may be referred to as the upstream side, and the side on which the processing device or the temporary storage hopper 30 is disposed may be referred to as the downstream side.

The transport path 2 is a passage through which resin pellets (resin granules) 3 are transported from the raw material hopper 20 to the temporary storage hopper 30 or the processing device.

In FIG. 1, the transport path 2 consists of a trough (first transport path) 2A, a transport pipe (second transport path) 2B, and a slope (third transport path) 2C. FIG. 1 is an example of the transport path 2 and is not required to be divided into multiple stages. For example, the transport path may be formed of a series of inclined planes.

The resin pellets are produced using a known method.

For example, a raw material resin is heated and kneaded, extruded in the form of a strand or a rod through a strand die, and cut by a cutting device such as a cutter to produce resin pellets. Magnetic foreign matter may adhere to or be mixed in the resin pellets during the cutting by the cutting device.

The resin is kneaded using, for example, a mixer, a uniaxial/biaxial kneading device, a blender, or the like. The resin temperature during the kneading is typically higher than any higher one of the glass transition temperature and the melting temperature of the resin by 20° C. to 150° C.

Regarding the pellet shape, in a case where the resin is extruded in the form of a strand, a cross-section thereof has an annular shape or an elliptical shape, and the average diameter is 0.1 to 15 mm. The pellet length is 0.1 to 15 mm, and can be appropriately changed in accordance with the purpose.

Examples of the strand cutting aspect include cold cutting for cutting a rod-like strand extruded from a hole of the die and solidified by water-cooling, and hot-cutting immediately after extrusion from the hole of the die.

In the manufacturing of the resin pellets, the strand and the resin pellets may be destaticized in a brief manner in order to prevent the resin pellets from adhering to each other. An ion shower is an example of the destaticizing method. As an example of the ion shower, there is a method of ionizing oxygen molecules or nitrogen molecules in the air and blowing ions to a target object. For example, the ion shower is performed when a strand is formed before cutting, when the strand is cut and resin pellets are produced, or when the produced resin pellets 3 are stored in a flexible container. Actually, the ion shower is omitted in many cases due to the cost.

For the resin pellets, for example, a polyvinyl chloride, an ethylene/vinyl acetate copolymer, an ethylene/vinyl chloride copolymer, a polystyrene ethylene/vinyl chloride copolymer, an ethylene/vinyl acetate copolymer, a polystyrene, an AS resin, a MBS resin, an ABS resin, other aromatic vinyl compound-based resins, Nylon 6, polyacetal/Nylon 6, Nylon 6.6, an acrylic resin, other polyamides, a polybutylene terephthalate, a polyethylene terephthalate, other polyesters, a polycarbonate, a polyphenylene sulfide, a polyetherimide, a polyarylate, a polyethylene, a polypropylene, a mixture thereof, or the like can be used. Among these, a polyolefin such as a polyethylene or a polypropylene has high versatility.

The transport path 2 preferably has a vibration feeder (movement control mechanism). The vibration feeder vibrates the transport path 2 to maintain a substantially constant transport amount of the resin pellets 3 transported through the transport path 2. For example, an electromagnetic solenoid or the like can apply vibration to the transport path 2. The transport amount of the resin pellets 3 transported on the transport path 2 per unit time becomes substantially constant by virtue of the vibration.

The vibration feeder is preferably disposed in the trough 2A which initially receives the resin pellets 3 supplied from the raw material hopper 20. The sorting device 10 adsorbs and removes magnetic foreign matter adhering to the resin pellets 3 by the second magnet 8 to be described later. Otherwise, sorting device 10 adsorbs and removes the resin pellet which contains the magnetic foreign matter being mixed into the resin pellet 3 in a inseparable manner. Accordingly, a function of adjusting the transport amount of the resin pellets 3 in the slope 2C above which the second magnet 8 is disposed is required. By maintaining a substantially constant transport amount of the resin pellets 3 in the trough 2A, the transport amount of the resin pellets 3 in the slope 2C can be adjusted to be substantially constant.

Here, the vibration feeder is not limited to the above-described mechanism such as an electromagnetic solenoid. The vibration feeder is not particularly limited as long as it is a mechanism capable of transporting a substantially constant amount of resin pellets 3. For example, a screw feeder or a mechanism using a rotary valve may be used. In such a mechanism, it is possible to transport a substantially constant amount of resin pellets 3 per unit time.

The first magnet 4 is disposed above the trough 2A. The first magnet 4 is not essential, but by providing the first magnet 4, the removal accuracy of magnetic foreign matter increases. The first magnet 4 magnetizes magnetic foreign matter adhering to or mixed in the resin pellets 3. The first magnet 4 forms a magnetic field in the trough 2A. When the magnetic foreign matter adhering to or mixed in the resin pellets 3 passes through the formed magnetic field, the magnetization in the magnetic foreign matter is directed along a specific direction, and the magnetic foreign matter is magnetized.

The shape of the first magnet 4 is not particularly limited. The first magnet 4 preferably can form a uniform magnetic field in a width direction of the trough 2A.

The system, shape, or the like of the first magnet 4 is not particularly limited. For example, a first magnet 4 having a long and narrow rectangular shape may be formed and may have a configuration having a magnetization surface which generates a substantially uniform magnetic flux density in a longitudinal direction. The first magnet 4 forming a substantially uniform magnetic flux density in a longitudinal direction can form a magnetic field having no unevenness.

In a case where a rectangular first magnet 4 is used, a longitudinal direction of the first magnet 4 is matched with a direction substantially perpendicular to a transport direction of the resin pellets 3. The magnetization surface 4a of the first magnet 4 is opposed to the trough 2A. The magnetization surface 4a and the trough 2A are disposed such that a constant interval is interposed therebetween, and the resin pellets 3 pass between the magnetization surface 4a and the trough 2A. It is preferable that the interval between the magnetization surface 4a and the trough 2A be as narrow as possible while the magnetization surface and the trough be separated from each other such that the first magnet 4 is not in contact with the resin pellets 3. The magnetic foreign matter adhering to or mixed in the resin pellets 3 can be securely magnetized in a case where the resin pellets 3 and the first magnet 4 are brought closer to each other.

The first magnet 4 may be a permanent magnet or an electromagnet. In a case of an electromagnet, it is necessary to supply electricity, but the strength of a magnetic field to be formed can be freely controlled. In a case of a permanent magnet, electricity is not required for forming a magnetic field, and thus a running cost is cut down.

The distance between the trough 2A and the magnetization surface 4a is appropriately adjusted in consideration of a surface magnetic flux density required for magnetization, the size of the resin pellets 3 to be transported, and the like. For example, a first magnet 4 having a surface magnetic flux density of 5,000 to 30,000 gauss is separated from the trough 2A by 10 to 12 mm such that the resin pellets 3 can pass therebetween, and a magnetic field is applied to the resin pellets 3 passing between the trough 2A and the first magnet 4. The surface magnetic flux density generated on the surface of the trough 2A for magnetization is determined in accordance with the kind, amount, and removal accuracy of the magnetic foreign matter thought to adhere to or be mixed in the resin pellets 3.

The distance between the trough 2A and the magnetization surface 4a can be appropriately adjusted. For example, a first magnet 4 having a surface magnetic flux density of 10,000 gauss (1.0 tesla) may be separated from the trough 2A by 10 to 12 mm such that the resin pellets 3 can pass therebetween, and a magnetic field of approximately 0.5 tesla (5,000 gauss) may be applied to the resin pellets 3 passing between the trough 2A and the first magnet 4. In addition, a first magnet 4 having a higher surface magnetic flux density of 1.5 tesla, 2.0 tesla, 2.5 tesla, 2.7 tesla, or 3.0 tesla may be used with a distance of 10 to 12 mm between the trough 2A and the first magnet 4 to form a stronger magnetic field. The distance between the slope 2A and the magnetization surface 4a is preferably adjusted in accordance with the size of the resin pellets 3 such that the resin pellets 3 are not in contact with the magnetization surface 4a.

The first magnet 4 preferably has a magnetic flux density of 0.5 tesla or greater. The magnetic flux density is more preferably 1.0 tesla or greater, even more preferably 1.5 tesla or greater, and particularly preferably 2.0 tesla or greater. In a case where the first magnet 4 has a sufficient magnetic flux density, even fine magnetic foreign matter is securely magnetized.

The destaticizer 6 is provided in the transport pipe 2B. For example, an upper surface of the transport pipe 2B is opened and an ionizer or the like is provided. Hereinafter, description will be given by using a case in which an ionizer as an example of the destaticizer 6 is used as an example.

The ionizer 6 supplies ions. The ionizer 6 can supply plus (positive) ions and minus (negative) ions, and the amount of plus ions and minus ions to be supplied is controlled by a controller (omitted in the drawing).

The ionizer 6 is provided with a discharge needle for a plus ion and a discharge needle for a minus ion, and applies a voltage to each discharge needle to generate a corona discharge. Accordingly, positive ions or negative ions generated as a result are supplied through an ion supply port (omitted in the drawing). The supply port of the ionizer 6 is directed toward the transport pipe 2B. The ions supplied from the ion supply port destaticize the transported resin pellets 3.

The concentration of positive ions or negative ions may be adjusted manually or automatically. The concentration of ions supplied from the ionizer 6 is adjusted from the amount of ions to be supplied, which is required in accordance with the charging amount of the resin pellets 3. The ionizer 6 destaticizes the resin pellets 3 when the resin pellets 3 are transported in the transport pipe 2B. Therefore, the static electricity of the resin pellets 3 supplied to the slope 2C is removed. In a case where the static electricity is removed, inhibition or reduction of magnetic adsorption is avoided in the second magnet 8 to be described later.

A sensor that detects a charge level may be provided in the transport path. A signal from the sensor is processed to determine a charge level of the resin pellets 3 by a detection circuit, and based on the charge level determined by the detection circuit, the amount of positive or negative ions to be supplied is adjusted. Using the sensor, it is possible to omit an effort for adjusting the charge level of the resin pellets 3. That is, it is possible to obtain a convenient sorting device.

In order to disperse ions as uniformly as possible in the transport pipe 2B, air containing ions may be supplied with a predetermined wind pressure. The wind pressure is not particularly limited, but there is a concern that static electricity may be generated due to the collision between the moving resin pellets 3. Therefore, a wind pressure with which the resin pellets 3 remain at rest is preferable. By supplying air containing ions, the resin pellets 3 are moved in an atmosphere filled with the air. As a result, each resin pellet can be destaticized in a relatively short period of time. In this method, destaticizing is possible in a shorter period of time than in a method of performing destaticizing by grounding, and thus the yield is improved. In addition, a compact sorting device is obtained.

The second magnet 8 forms a magnetic adsorption region 7 on the slope 2C. The magnetic adsorption region 7 is formed in a housing (omitted in the drawing) surrounding, for example, the slope 2C on which the resin pellets 3 flow down and the second magnet 8 disposed above the slope 2C with a constant interval therebetween. The slope 2C has, for example, an inclined plane (moving plane) having an inclination of 15° to 30° from the horizontal direction, and the resin pellets 3 flow down the inclined plane.

The magnetic adsorption region 7 formed by the second magnet 8 adsorbs magnetic foreign matter adhering to or mixed in the resin pellets 3 flowing down the slope 2C. By adsorbing the magnetic foreign matter by the second magnet 8, the magnetic foreign matter is removed from the resin pellets 3 supplied to the temporary storage hopper 30 or the like. Moreover, since the magnetic foreign matter is magnetized by the first magnet 4, the magnetic foreign matter is removed completely in the second magnet 8.

The magnetic foreign matter mixed in the resin pellets 3 flowing down the slope 2C is adsorbed by a adsorption surface of the second magnet 8. A user periodically removes and collects the magnetic foreign matter adsorbed by the adsorption surface. Accordingly, the second magnet 8 can be continuously used.

The interval between the slope 2C and the second magnet 8 may be an interval through which the resin pellets can pass. In a case where the slope and the second magnet are too far apart, the strength of the magnetic field acting on the resin pellets 3 is reduced. Therefore, it is preferable that the second magnet 8 be brought as close as possible to the slope 2C so as not to be in contact with the resin pellets 3.

The system, shape, or the like of the second magnet 8 is not particularly limited. For example, a second magnet 8 having a long and narrow rectangular shape may be formed and may be provided with a magnetic adsorption surface 8a which generates a substantially uniform magnetic flux density in a longitudinal direction. The second magnet 8 forming a substantially uniform magnetic flux density in a longitudinal direction can form a magnetic field having no unevenness.

In a case where a rectangular second magnet 8 is used, a longitudinal direction of the second magnet 8 is matched with a direction substantially perpendicular to a transport direction of the resin pellets 3. The magnetic adsorption surface 8a of the second magnet 8 is opposed to the slope 2C. The magnetic adsorption surface 8a and the slope 2C are disposed such that a constant interval is interposed therebetween, and the resin pellets 3 pass between the magnetic adsorption surface 8a and the slope 2C. It is preferable that the interval between the magnetic adsorption surface 8a and the slope 2C be as narrow as possible from the viewpoint of the magnetic strength provided to the resin pellets 3.

As in the case of the first magnet 4, the second magnet 8 may be a permanent magnet or an electromagnet. In a case of an electromagnet, it is necessary to supply electricity, but the strength of a magnetic field to be formed can be freely controlled. In a case of a permanent magnet, electricity is not required for forming a magnetic field, and thus a running cost is cut down.

The distance between the slope 2C and the magnetic adsorption surface 8a can be appropriately adjusted. For example, a second magnet 8 having a surface magnetic flux density of 10,000 gauss (1.0 tesla) may be separated from the slope 2C by 10 mm such that the resin pellets 3 can pass therebetween, and a magnetic field of approximately 0.5 tesla (5,000 gauss) may be applied to the resin pellets 3 passing between the slope 2C and the second magnet 8. In addition, a second magnet 8 having a higher surface magnetic flux density of 1.5 tesla, 2.0 tesla, 2.5 tesla, 2.7 tesla, or 3.0 tesla may be used with a distance of 10 mm between the slope 2C and the second magnet 8 to form a stronger magnetic field. The distance between the slope 2C and the magnetic adsorption surface 8a is preferably adjusted in accordance with the size of the resin pellets 3 such that the resin pellets 3 are not in contact with the magnetic adsorption surface 8a.

The second magnet 8 preferably has a magnetic flux density of 0.5 tesla or greater as described above. The magnetic flux density is more preferably 0.8 tesla or greater, even more preferably 1.0 tesla or greater, yet more preferably 1.5 tesla or greater, and particularly preferably 2.5 to 2.7 tesla or greater. In a case where the second magnet 8 has a sufficient magnetic flux density, an appropriate magnetic field is formed on the slope 2C. As a result, the removal accuracy of magnetic foreign matter adhering to the resin pellets or a resin pellet in which magnetic foreign matter is mixed increases.

The magnetic flux density of the second magnet 8 is preferably the same as or greater than the magnetic flux density of the first magnet 4. By adjusting the magnetic flux density of each magnet, a role of magnetizing magnetic foreign matter by the first magnet 4 and a role of adsorbing magnetic foreign matter by the second magnet 8 can be secured.

As described above, in a case where the sorting device 10 according to the aspect is used, magnetic foreign matter adhering to or mixed in the resin pellets 3 is appropriately removed. In addition, due to destaticizing by the destaticizer 6, the influence of the electrostatic force can be avoided, and thus the adsorption accuracy of magnetic foreign matter increases. Furthermore, the removal accuracy of magnetic foreign matter increases by magnetization by the first magnet 4 before the second magnet 8 adsorbs the magnetic foreign matter.

The magnetic foreign matter removable by the sorting device 10 according to the aspect has various sizes of 20 µm to several hundreds of µm, and especially, magnetic foreign matter having a size of 20 µm to 100 µm can be removed. In particular, magnetic foreign matter having a size of 50 µm or less can be removed with high accuracy.

Whether magnetic foreign matter adheres to or is mixed in the resin pellets (pellets having magnetic foreign matter adhering thereto or mixed therein: defective pellets) can be determined by monitoring variations in the magnetic field by the magnetic foreign matter moving in the magnetic field.

Examples of means for detecting a magnetic field include magnetic field-detecting devices such as a Gauss meter, a loop coil, and a magnet meter using a magnetic impedance element (MI element).

In a case where a magnetic field-detecting device is disposed near the transport path of the resin pellets, magnetic foreign matter adhering to or mixed in the resin pellets can be monitored. The position of the magnetic field-detecting device, the number of magnetic field-detecting devices, and the like are appropriately changed to provide an optimum aspect.

As another inspection method of detecting magnetic foreign matter adhering to or mixed in the resin pellets, there is a method including: acquiring a microscopic image of resin pellets; detecting foreign matter by collating the acquired image with a previously prepared foreign matter image; and removing a resin pellet in which the foreign matter is detected.

In a case where it is required to increase the transport speed of the resin pellets 3, the angle of the slope is changed to a steeper angle. The amount of ions to be supplied from the ionizer is preferably increased with a change of the angle of the slope to a steeper angle. By increasing the amount of ions to be supplied, destaticizing can be securely performed with a simple configuration even in a case where the transport speed of the resin pellets is increased. However, for example, in a case where a belt conveyor is used, it is required to reduce to some extent the relative speed difference when resin pellets are placed on the belt conveyor, and thus the configuration of the entire device is complicated.

Next, an operation of the sorting device 10 according to the first embodiment will be described.

Resin pellets 3 injected to the opening 20a of the raw material hopper 20 are discharged from the discharge port 20b of the raw material hopper 20 to the trough 2A. The discharged resin pellets 3 are transported from the upstream to the downstream of the trough 2A while a substantially uniform transport amount per unit time is maintained by the vibration feeder. The first magnet 4 is disposed above the trough 2A. The first magnet 4 magnetizes magnetic foreign matter adhering to or mixed in the transported resin pellets 3.

The resin pellets 3 transported to the downstream side of the trough 2A are sent to the slope 2C via the transport pipe 2B. In the transport pipe 2B, the resin pellets 3 are destaticized by positive ions or negative ions supplied from the ion supply port of the ionizer 6.

The destaticized resin pellets 3 are sent to the upstream side of the slope 2C and flow down toward the downstream side from the upstream side on the slope 2C. The second magnet 8 is disposed above the slope 2C. The second magnet 8 applies a magnetic field to the resin pellets 3 flowing down the slope 2C. The magnetic foreign matter adhering to or mixed in the resin pellets 3 is adsorbed and removed by the second magnet 8 when the resin pellets 3 pass through a clearance having a constant interval provided between the second magnet 8 and the slope 2C. The resin pellets 3 from which the magnetic foreign matter is removed are stored in the temporary storage hopper 30.

As described above, the sorting device according to this embodiment previously destaticizes the resin pellets 3 by the ionizer 6. The magnetic foreign matter is magnetically adsorbed by the second magnet 8 from the destaticized resin pellets 3. Therefore, the influence of the electrostatic force on the resin pellets 3 is reduced, and the magnetic foreign matter having a size of about 50 μm can be more securely removed. In addition, the re-adhesion of the magnetic foreign matter by the electrostatic force can be avoided.

The first magnet 4 magnetizes magnetic foreign matter. By magnetizing the magnetic foreign matter until the magnetic foreign matter reaches the second magnet 8, it is possible to more securely adsorb and remove the magnetic foreign matter in the second magnet 8.

In addition, by substantially uniformizing the transport amount of the resin pellets 3 by the vibration feeder 5, magnetization by the first magnet 4, destaticizing by the ionizer 6, and adsorption by the second magnet 8 are performed without unevenness.

The invention is not necessarily limited to the configuration of the sorting device 10 shown as the first embodiment. Various changes can be made without departing from the gist of the invention.

Figure 2:
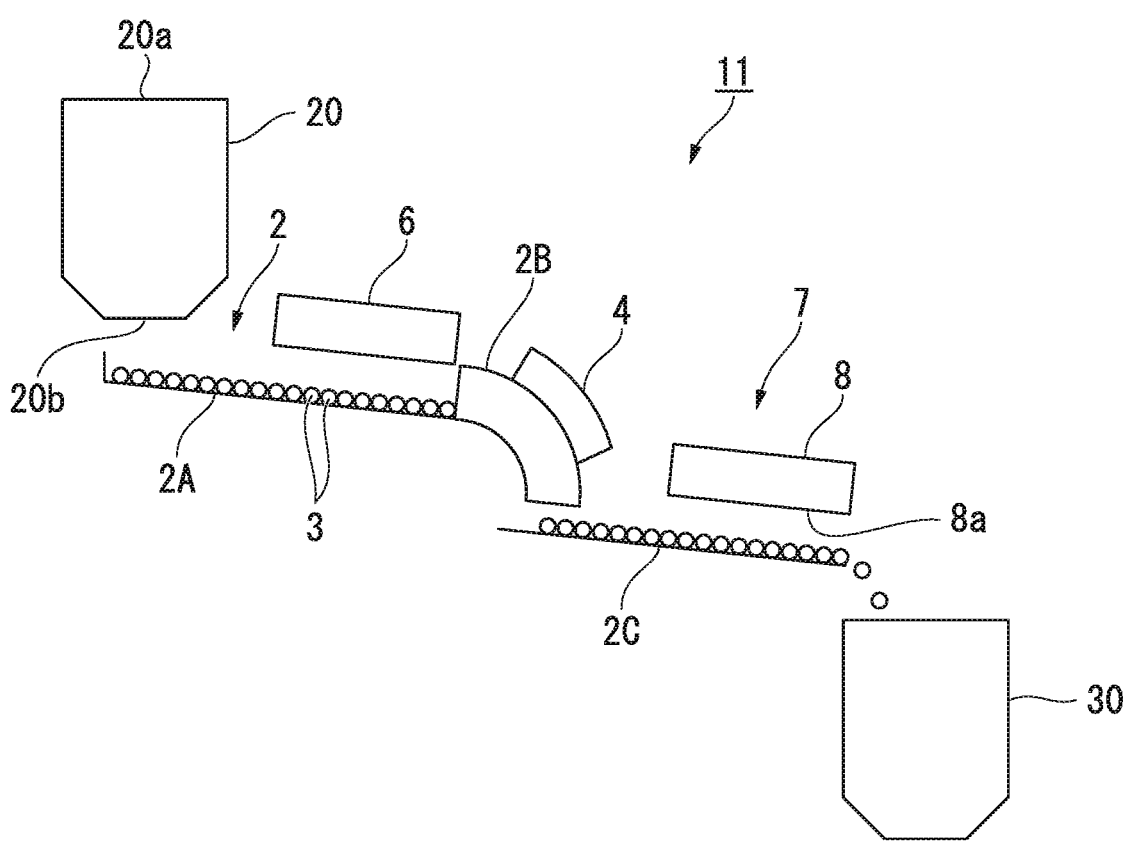
FIG. 2 is a schematic diagram illustrating a modification example of the sorting device according to the first embodiment of the invention.

For example, the arrangement order of the first magnet 4 and the ionizer 6 may be changed as in a case of a sorting device 11 illustrated in FIG. 2. In this case, magnetization by the first magnet 4 and destaticizing by the ionizer 6 are performed also until the magnetic foreign matter reaches the second magnet 8. However, in a case where the resin pellets 3 are transported over a long distance after destaticizing by the ionizer 6, there is a concern that charging may occur again by static electricity. Accordingly, the distance between the ionizer 6 and the second magnet 8 is preferably as short as possible.

Figure 3:
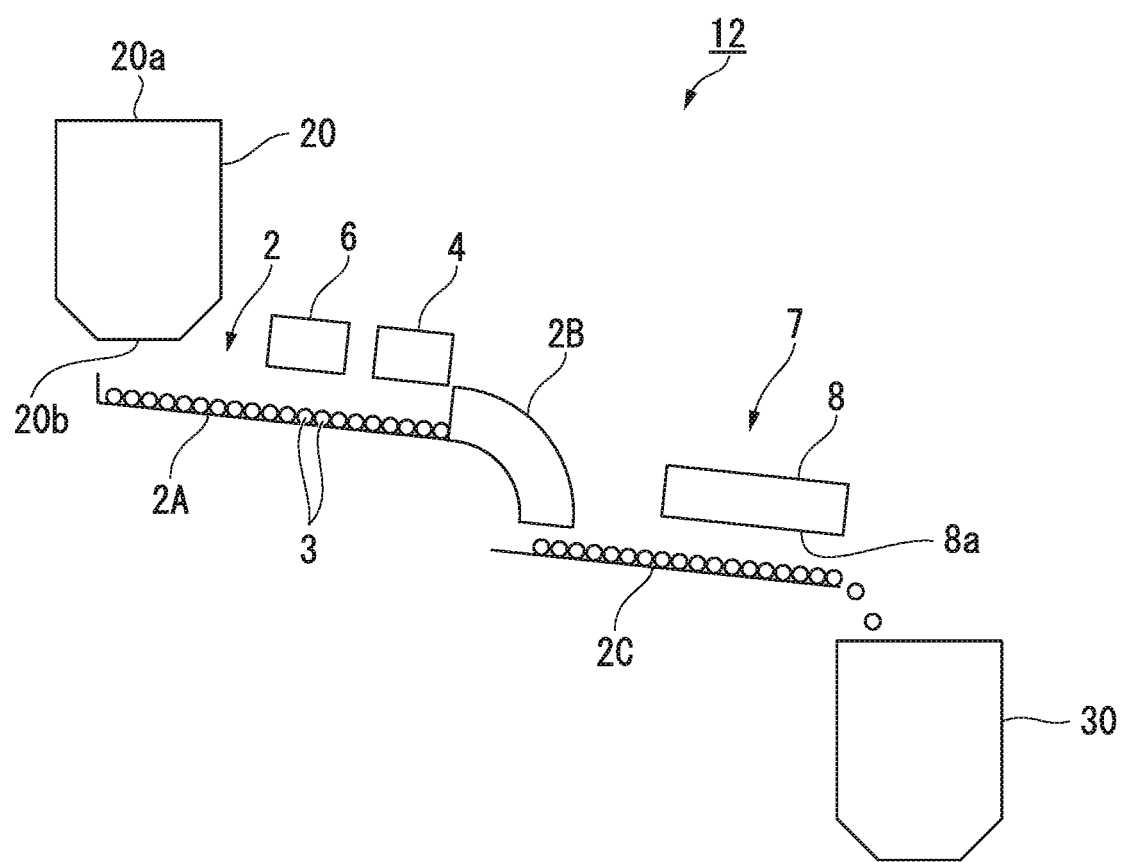
FIG. 3 is a schematic diagram illustrating a modification example of the sorting device according to the first embodiment of the invention.

In addition, the first magnet 4 and the ionizer 6 may exist above the trough 2A as in a case of a sorting device 12 illustrated in FIG. 3. In this case, magnetization by the first magnet 4 and destaticizing by the ionizer 6 are performed also until the magnetic foreign matter reaches the second magnet 8. In addition, all of the first magnet 4, the ionizer 6, and the second magnet 8 may be disposed above the trough 2A or the slope 2C.

It is not required to use only one ionizer 6, and for example, an ionizer may be disposed on each of the downstream side of the trough 2A and the upstream sides of the transport pipe 2B and the slope 2C.

Second Embodiment

Figure 4:
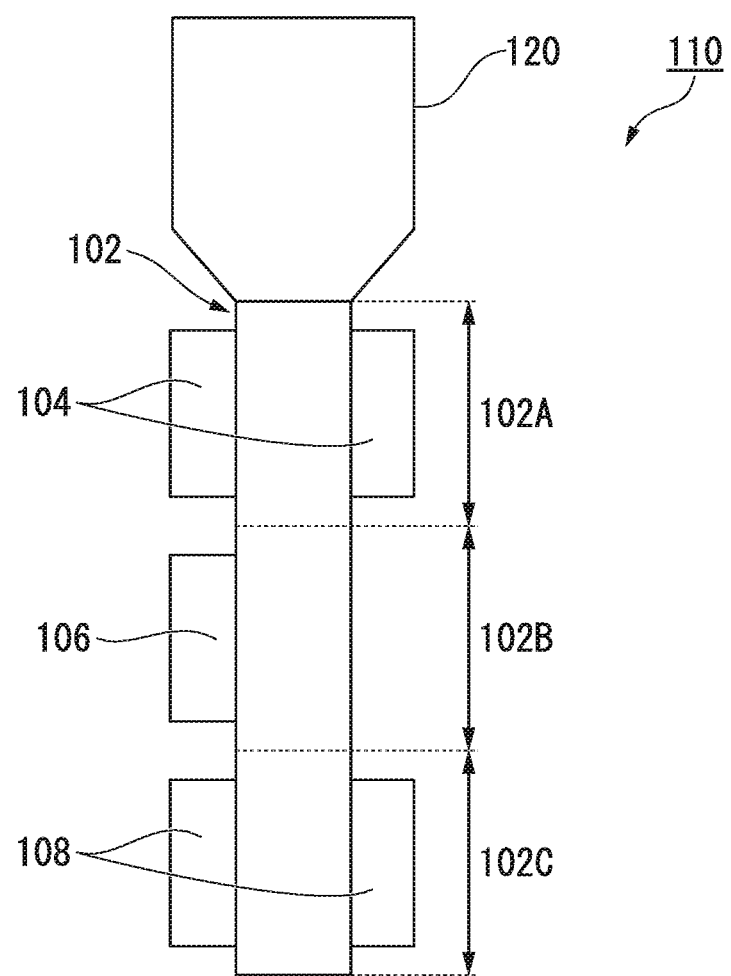
FIG. 4 is a schematic diagram of a sorting device according to a second embodiment of the invention.

FIG. 4 is a schematic diagram of a sorting device according to a second embodiment. As illustrated in FIG. 4, a sorting device 110 according to the second embodiment has a transport path 102, a first magnet 104, a destaticizer 106, and a second magnet 108. A raw material hopper 120 is disposed on one end side of the sorting device 110, and a temporary storage hopper or the like omitted in the drawing is disposed on the other end side.

The transport path 102 includes a first region 102A, a second region 102B, and a third region 102C. The first magnet 104 is disposed in the first region 102A, the ionizer 106 is disposed in the second region 102B, and the second magnet 108 is disposed in the third region 102C along the transport path 102.

As the first magnet 104, the ionizer 106, and the second magnet 108, it is possible to use those are similar to the first magnet 4, the ionizer 6, and the second magnet 8 in the first embodiment, respectively, can be used.

In the sorting device 110, the resin pellets discharged from the lower part of the raw material hopper 120 freely fall by gravity. The resin pellets enter the first region 102A during the course of free falling.

The magnetic foreign matter adhering to or mixed in the resin pellets entering the first region 102A is magnetized when passing through a magnetic field generated by the first magnet 104. The resin pellets after passing through the first region 102A enter the second region 102B and are destaticized by positive ions or negative ions supplied from the ionizer 106. Finally, the destaticized resin pellets enter the third region 102C and pass through a magnetic field generated by the second magnet 108. In this case, the magnetic foreign matter or the pellets having magnetic foreign matter mixed therein are adsorbed by the second magnet 108. The resin pellets from which the magnetic foreign matter is removed are stored in a temporary storage hopper or the like omitted in the drawing.

The first magnet 104 and the second magnet 108 are preferably disposed so as to surround the transport path 102. In a case where the first magnet 104 surrounds the transport path 102, magnetic foreign matter adhering to or mixed in the resin pellets freely falling in the transport path 102 can be more securely magnetized. Similarly, in a case where the second magnet 108 surrounds the transport path 102, magnetic foreign matter adhering to or mixed in the resin pellets freely falling in the transport path 102 can be more securely adsorbed.

The air containing ions supplied from the ionizer 106 is preferably distributed throughout the whole surface intersecting a transport direction of the transport path 102. The resin pellets can be destaticized without unevenness in a case where the air containing ions is distributed throughout the whole surface.

As described above, using the sorting device 110 according to the second embodiment, it is possible to appropriately remove magnetic foreign matter adhering to or mixed in the resin pellets. In addition, since destaticizing is performed by the destaticizer 106, the magnetic foreign matter can be adsorbed and removed from the resin pellets without being influenced by the electrostatic force. Moreover, the removal accuracy of magnetic foreign matter can be increased by magnetization by the first magnet 104 before the second magnet 108 adsorbs the magnetic foreign matter. As a result, high-quality resin pellets can be provided.

The magnetic foreign matter removable by the sorting device 110 according to the second embodiment has various sizes of 20 μm to several hundreds of μm, and especially, magnetic foreign matter having a size of 20 μm to 100 μm can be removed. In particular, magnetic foreign matter having a size of about 50 μm can be accurately removed.

[Resin Granule Mass]

A resin granule mass according to this embodiment includes a plurality of resin granules. In a case where resin granules are packed in one bag (flexible container or the like), the resin granules included in the bag is regarded as one resin granule mass.

Examples of the resin granules constituting a resin granule mass include the above-described resin pellets and a resin powder. The resin pellets and the resin powder are a form of shipping when the raw material resin is shipped, and in general, these are specified by size in many cases. Resin pellets are a mass of resin particles having a size of approximately 2 to 3 mm, and in many cases, a powder refers to a mass of resin particles having a size smaller than a pellet size.

In a strict sense, resin pellets are not specified by size and refer to a general shipping form of a resin which has been melted and processed. However, resin pellets are selectively used depending on the size for convenience in many cases.

Magnetic foreign matter is foreign matter which accumulates and adheres in the course of manufacturing resin granules or in a flexible container which is repeatedly used. Metallic foreign matter includes a part of a metal blade mixed during cutting of a strand, and resin granules adsorbed by static electricity generated during collision of the resin granules with each other.

In a plurality of resin granules included in a resin granule mass, the proportion of resin granules having magnetic foreign matter of 50 μm or greater adhering thereto (hereinafter, referred to as a foreign matter-adhering product) is 30% or less. The proportion of foreign matter-adhering products is preferably 20% or less, and more preferably 10% or less.

The number of kinds of foreign matter included in the resin pellets is two. A first kind is foreign matter mixed in the pellets and cannot be removed in a case where a process such as filtration is not performed after pulverization or melting/dissolving of the resin pellets. A second kind is foreign matter adhering to a pellet surface by static electricity or the like. The former can be classified as mixed foreign matter, and the latter can be classified as adhesive foreign matter.

The foreign matter-adhering product in the resin granule mass has an influence on the quality of a manufactured product. Magnetic foreign matter having a size of 50 μm or greater or a large amount of magnetic foreign matter having a size of 50 μm or less deteriorates the product quality.

In the resin granule mass according to this embodiment, the proportion of foreign matter-adhering products or foreign matter-mixed products is low, and the size of magnetic foreign matter adhering to foreign matter-adhering products or foreign matter-mixed products is small. Therefore, the resin granule mass can be used in the production of high-quality products. Particularly, adhesive foreign matter causes defective forming such as fisheye in resin films. Accordingly, the resin granule mass according to this embodiment can be appropriately used in the production of resin films.

Here, the resin granule mass according to this embodiment is valuable from the viewpoint of mass productivity of products such as resin films. In general, the total weight of a flexible container containing the resin granules packed therein is 500 kg to 1,000 kg. That is, the number of resin granules packed in one flexible container is very large. Accordingly, evaluating each resin granule is not realistic in normal mass production, and the resin granule mass is collectively used in the product processing.

That is, in the industrial distribution for product processing using resin granules, the resin granules are distributed in units of resin granule mass. Therefore, in a case where a resin granule mass in which the proportion of foreign matter-adhering products is reduced is used, the inspection step before product processing can be omitted, and the manufacturing cost can be reduced. In addition, in a case where a resin granule mass in which the proportion of foreign matter-adhering products is reduced is used, the product quality also increases. That is, a resin granule mass in which the proportion of foreign matter-adhering products or foreign matter-mixed products is reduced is industrially valuable.

The resin granule mass in which the proportion of foreign matter-adhering products or foreign matter-mixed products is reduced is obtained using the above-described sorting device.

The above-described sorting device can also remove magnetic foreign matter having a size of about 50 μm. Accordingly, the proportion of resin granules having magnetic foreign matter of 50 μm or greater adhering thereto or mixed therein in a plurality of resin granules included in the resin granule mass can be adjusted to 30% or less. Depending on the conditions of the sorting device, the proportion of resin granules having magnetic foreign matter of 50 μm or greater adhering thereto or mixed therein in a plurality of resin granules can also be adjusted to 20% or less or 10% or less.

For example, in the device described in any one of Patent Documents 4 to 7, magnetic foreign matter cannot be removed with the accuracy of a size of 50 μm. These devices also have many problems since the processing performance per unit time is low.

As described above, in a case where the resin granule mass according to this embodiment is used, high-quality resin products can be obtained.

[Resin Film]

A resin film according to this embodiment is obtained from the above-described resin granule mass. Regarding the resin film, a detecting ratio of magnetic foreign matter of 50 μm or greater is 140 $mm^2$ or less per 1 $m^2$ in terms of a thickness of 10 μm.

Here, the [detecting ratio of magnetic foreign matter] is obtained as follows. First, an area in which magnetic foreign matter is detected is obtained per unit area (1 $m^2$) in an in-plane direction of a resin film. In addition, the amount of resin used in the resin film varies by the thickness, and thus conversion is performed in terms of detection area per thickness of 10 μm.

A resin film is obtained by melting a resin granule mass. Accordingly, foreign matter adhering to the resin granule mass is mixed in the resin film. As described above, since the proportion of foreign matter-adhering products in the resin granule mass is reduced, the amount of magnetic foreign matter detected in the resin film is also reduced.

Mixed ratio of magnetic foreign matter in a resin film can be determined by monitoring variations in the magnetic field caused by movement of the magnetic foreign matter in the magnetic field.

Examples of means for detecting a magnetic field include magnetic field-detecting devices such as a Gauss meter, a loop coil, and a magnet meter using a magnetic impedance element (MI element).

In a case where a magnetic field-detecting device is disposed near the transport path of the resin film, magnetic foreign matter in the resin pellets can be monitored. The position of the magnetic field-detecting device, the number of magnetic field-detecting devices, and the like are appropriately changed to provide an optimum aspect. The detection accuracy increases in a case where a plurality of the magnetic field-detecting devices are arranged in a line in a direction substantially perpendicular to the transport direction of the resin film (width direction).

The resin film is obtained using a known method. For example, film forming using a T-die, inflation forming using an annular die, or the like can be used. The resin film may be a resin film obtained by forming a single resin as a single layer, or a resin film in which layers of a plurality of resins overlap each other. The resin film in which a plurality of layers overlap each other is obtained by forming using a feed block or forming using a multi-manifold die.

A separator used in an electric storage device such as a lithium ion secondary battery is an example of the resin film. The separator is a fine porous film provided with fine holes.

The method of forming fine pores in a resin film can be roughly classified into a wet method and a dry method according to the pore-forming method.

The following method is an example of the wet method. A mixture obtained by adding and mixing a resin such as a polyethylene or a polypropylene that is a matrix resin constituting a fine porous film and an additive is formed into a sheet. After forming into a sheet, the additive is extracted from the film formed of the matrix resin and the additive to form voids in the matrix resin. Then, the film is stretched, and thus a fine porous film is manufactured. As the additive, a solvent, a plasticizer, inorganic fine particles, or the like to be mixed with the resin is proposed.

The following method is an example of the dry method. By employing a high draft ratio in the melt-extrusion, a lamellar structure in the film before stretching, which is formed into a sheet, is controlled. In addition, in a case where the sheet is uniaxially stretched, cleavage occurs at the lamellar interface, and voids are formed.

Regardless of the wet method and dry method which have been described above, it is important to use a resin raw material in which the adhesion of magnetic foreign matter is reduced in a separator used in an electric storage device such as a lithium ion secondary battery.

The separator is obtained from the above-described resin film. Therefore, the separator is a fine porous film with a small content of magnetic foreign matter. Specifically, the detecting ratio of magnetic foreign matter of 50 μm or greater is 170 mm$^2$ or less per 1 m$^2$ in terms of a thickness of 20 μm. In a case of the resin film before stretching, conversion is performed in terms of a thickness of 10 μm, and in a case of the separator after stretching, conversion is performed in terms of a thickness of 20 μm.

Such a separator can be appropriately used in, for example, an electric storage device such as a lithium ion battery. Since the content of magnetic foreign matter is low, the risk of a problem occurring such as a short circuit or ignition is reduced or resolved. That is, a high-quality electric storage device is obtained.

EXAMPLES

Next, the invention will be described in more detail with reference to examples, but is not limited to these examples.

[Method of Inspecting Magnetic Foreign Matter Adhering to Resin Granules of Resin Granule Mass]

In the examples, magnetic foreign matter mixed in resin granules of a resin granule mass was inspected using a sensitive metallic foreign matter detector.

In the inspection of 2,000 pellet particles using a sensitive metallic foreign matter detector "BTTER" manufactured by GNS as a metallic foreign matter detector, the number (N) of resin pellets in which a magnetic foreign matter reaction was detected was examined in order to investigate the proportion of resin granules having magnetic foreign matter adhering thereto using the following expression. The metallic foreign matter detector can detect magnetic foreign matter of 100 μm or less with high accuracy.

The detection sensitivity of the magnetic foreign matter reaction was adjusted such that iron particles having a diameter of 50 μm were inspected and allowed to be 100 percent detected.

Proportion (%) of Resin Granules Having Magnetic Foreign Matter Adhering Thereto=$N$(number)/2,000(number)×100

A reduction in the proportion of resin granules having magnetic foreign matter adhering thereto means a reduction in the amount of pellets having magnetic foreign matter mixed in or adhering thereto. By processing pellets in which the amount of magnetic granules adhering is small, a processed product such as a film in which the amount of magnetic foreign matter mixed is small can be provided.

[Method of Inspecting Magnetic Foreign Matter Mixed in Resin Film]

Magnetic foreign matter contained in a resin film obtained by processing resin pellets or the like or a separator film obtained by stretching the resin film was inspected using an ultrasensitive AC Gauss meter (J-ACMG 2 type) manufactured by GNS. The inspection was performed using a test piece of 0.1 m$^2$ with an inspection sensitivity allowing 100 percent detection of iron particles having a diameter of 50 μm, and an area in which the magnetic foreign matter reaction was detected was calculated.

The inspection was performed at five positions with an area of 20 cm×10 cm. A total area was 0.1 m$^2$. The area in which magnetic foreign matter was detected was expressed in mm$^2$ and divided by the area of the film subjected to the inspection to obtain an area in which the magnetic foreign matter was detected per unit area in mm$^2$/m$^2$.

For example, in a case where a magnetic foreign matter reaction of 5 mm$^2$ is detected in the inspection using a test piece of 20 cm×10 cm (0.02 m$^2$), calculation is performed as follows.

Detection Area(mm$^2$/m$^2$)=(5 mm$^2$(magnetic foreign matter reaction area))/(20cm×10cm(area of test piece))=250 mm$^2$/m$^2$ Regarding the actual detection area, five test pieces (0.02 m$^2$) of 20 cm×10 cm were prepared, and an average of measurement values was calculated for evaluation as an average detection area.

The amount of resin used varies by the thickness of the film. Accordingly, in a case of an unstretched film, the evaluation was performed within a detection area per thickness of 10 μm, and in a case of a stretched film provided with fine pores, the evaluation was performed within a detection area per thickness of 20 μm.

[Examination of Resin Granule Mass]

Example 1

A constant amount of resin pellets was supplied per unit time by a vibration feeder, and metallic foreign matter was magnetically adsorbed by a magnet on a moving plane (plane). The conditions were as follows:

Ionizer: ER-X016 manufactured by Panasonic Industrial Devices SUNX Co., Ltd.

Position of Ionizer: Above trough of vibration feeder

Surface Magnetic Flux Density of Second Magnet (adsorption magnet: electromagnet): 27,000 gauss (2.7 tesla)
Clearance Between Resin Pellet Moving Plane and Magnet: 10 mm
Used Resin Pellets: Polypropylene (PP)
Wind Pressure of Air Containing Positive or Negative Ions: 0.5 MPa Regarding the resin granule mass after the removal, the ratio of foreign matter-adhering products was examined using a sensitive metallic foreign matter detector. The proportion of resin granules having magnetic foreign matter adhering thereto was 15.8% by number. That is, the yield rate was 84.2%.

Comparative Example 1

Comparative Example 1 is different from Example 1 in that the destaticizer was not used. Other conditions were the same as Example 1.

Regarding the resin granule mass after the removal, the amount of magnetic foreign matter was examined using a sensitive metallic foreign matter detector. The proportion of resin granules having magnetic foreign matter adhering thereto was 43.8% by number. That is, the yield rate was 56.2%.

Comparative Example 21

With no application of commercially available PP pellets to the sorting device, the amount of foreign matter-adhering products contained in a resin granule mass was examined using a sensitive metallic foreign matter detector.

The proportion of resin granules having magnetic foreign matter adhering thereto was 51.9% by number. That is, the yield rate was 48.1%.

Example 2

Example 2 is different from Example 1 in that the resin constituting the resin granules was changed to a polyethylene (PE). Other conditions were the same as Example 1.

Regarding the resin granule mass after the removal, the amount of magnetic foreign matter was examined using a sensitive metallic foreign matter detector. The proportion of resin granules having magnetic foreign matter adhering thereto was 9.3% by number. That is, the yield rate was 90.7%.

Comparative Example 31

Comparative Example 3 is different from comparative Example 1 in that the resin constituting the resin granules was changed to a polyethylene (PE). Other conditions were the same as Example 1.

Regarding the resin granule mass after the removal, the amount of magnetic foreign matter was examined using a sensitive metallic foreign matter detector. The proportion of resin granules having magnetic foreign matter adhering thereto was 47.6% by number. That is, the yield rate was 52.4%.

Comparative Example 41

Comparative Example 4 is different from Comparative Example 2 in that the resin constituting the resin granules was changed to a polyethylene (PE). Other conditions were the same as Example 1.

The proportion of resin granules having magnetic foreign matter adhering thereto was 53.9% by number. That is, the yield rate was 46.1%.

Example 3

The same operation was carried out under the same conditions as in Example 2, except that the surface magnetic flux density of the second magnet was 15,000 gauss (1.5 tesla).

Regarding the resin granule mass after the removal, the amount of magnetic foreign matter was examined using a sensitive metallic foreign matter detector. The proportion of resin granules having magnetic foreign matter adhering thereto was 6.8% by number. That is, the yield rate was 93.2%.

Comparative Example 51

The same operation was carried out under the same conditions as in Comparative Example 3, except that the surface magnetic flux density of the second magnet was 15,000 gauss (1.5 tesla).

Regarding the resin granule mass after the removal, the amount of magnetic foreign matter was examined using a sensitive metallic foreign matter detector. The proportion of resin granules having magnetic foreign matter adhering thereto was 49.6% by number. That is, the yield rate was 50.4%.

Example 4

The same operation was carried out under the same conditions as in Example 1, except that a first magnet (magnetization magnet) magnetizing resin foreign matter adhering to the resin pellets was provided, and the surface magnetic flux density of the second magnet (adsorption magnet) adsorbing resin foreign matter was 10,000 gauss (1.0 tesla).

Specifically, the operation was performed under the following conditions:
Arrangement of Devices: First magnet, ionizer, second magnet from upstream side
Magnetic Flux Density of First Magnet (magnetization magnet: electromagnet): 10,000 gauss (1.0 tesla)
Ionizer: ER-X016 manufactured by Panasonic Industrial Devices SUNX Co., Ltd.
Wind Pressure of Air Containing Positive or Negative Ions from Ionizer: 0.5 MPa
The magnetic flux density of the second magnet (adsorption magnet: electromagnet) was 10,000 gauss (1.0 tesla).
Clearance Between Resin Pellet Moving Plane and Magnet: 10 mm
Used Resin Pellets: Polypropylene (PP)

Regarding the resin granule mass after the removal, the amount of magnetic foreign matter was examined using a sensitive metallic foreign matter detector. The proportion of resin granules having magnetic foreign matter adhering thereto was 9% by number. That is, the yield rate was 91%.

Example 5

Example 5 is different from Example 4 in that the resin constituting the resin granules was changed to a polyethylene (PE). Other conditions were the same as Example 4.

The proportion of resin granules having magnetic foreign matter adhering thereto was 5% by number. That is, the yield rate was 95%.

Example 61

Example 6 is different from Example 4 in that the surface magnetic flux density of the second magnet (adsorption magnet) adsorbing resin foreign matter was 20,000 gauss (2.0 tesla) and the wind pressure of the air supplied from the ionizer was 0.3 MPa. Other conditions were the same as Example 4. The charge level of the resin pellets discharged from the transport pipe was confirmed to be 0 V.

The proportion of resin granules having magnetic foreign matter adhering thereto was 3% by number. That is, the yield rate was 97%.

Example 71

Example 7 is different from Example 4, except that the resin constituting the resin granules was changed to a polyethylene (PE). Other conditions were the same as Example 6.

The proportion of resin granules having magnetic foreign matter adhering thereto was 2% by number. That is, the yield rate was 98%.

Example 8

Example 8 is different from Example 4 in that the surface magnetic flux density of the first magnet (adsorption magnet) adsorbing resin foreign matter was 20,000 gauss (2.0 tesla), the surface magnetic flux density of the second magnet (adsorption magnet) was 27,000 gauss (2.7 tesla), and the wind pressure of the air supplied from the ionizer was 0.2 MPa. Other conditions were the same as Example 4.

The proportion of resin granules having magnetic foreign matter adhering thereto was 2% by number. That is, the yield rate was 98%.

Example 9

Example 9 is different from Example 4 in that the resin constituting the resin granules was changed to a polyethylene (PE). Other conditions were the same as Example 8.

The proportion of resin granules having magnetic foreign matter adhering thereto was 2% by number. That is, the yield rate was 98%.

Example 10

Example 10 is different from Example 4 in that the wind pressure of the air supplied from the ionizer was 0.2 MPa. Other conditions were the same as Example 4.

The proportion of resin granules having magnetic foreign matter adhering thereto was 5% by number. That is, the yield rate was 95%.

Example 11

Example 11 is different from Example 4 in that the resin constituting the resin granules was changed to polyethylene (PE). Other conditions were the same as Example 10.

The proportion of resin granules having magnetic foreign matter adhering thereto was 2% by number. That is, the yield rate was 98%.

The following Table 1 collectively shows the results of Examples 1 to 3 and Comparative Example 1 to 5.

TABLE 1

| | | First Magnet (Magnetization Magnet) | | Ionizer | | Second Magnet (Suction Magnet) | | Proportion of Foreign Matter- | |
|---|---|---|---|---|---|---|---|---|---|
| | Resin | Presence or Absence | Magnetic Flux Density (T) | Presence or Absence | Wind Pressure (MPa) | Presence or Absence | Magnetic Flux Density (T) | Adhering Products (%) | Yield Rate (%) |
| Example 1 | PP | X | — | ○ | 0.5 | ○ | 2.7 | 15.8 | 84.2 |
| Comparative Example 1 | PP | X | — | X | — | ○ | 2.7 | 43.8 | 56.2 |
| Comparative Example 2 | PP | X | — | X | — | X | — | 51.9 | 48.1 |
| Example 2 | PE | X | — | ○ | 0.5 | ○ | 2.7 | 9.3 | 90.7 |
| Comparative Example 3 | PE | X | — | X | — | ○ | 2.7 | 47.6 | 52.4 |
| Comparative Example 4 | PE | X | — | X | — | X | — | 53.9 | 46.1 |
| Example 3 | PE | X | — | ○ | 0.5 | ○ | 1.5 | 9.4 | 90.6 |
| Comparative Example 5 | PE | X | — | X | — | ○ | 1.5 | 49.6 | 50.4 |
| Example 4 | PP | ○ | 1.0 | ○ | 0.5 | ○ | 1.0 | 9.0 | 91.0 |
| Example 5 | PE | ○ | 1.0 | ○ | 0.5 | ○ | 1.0 | 5.0 | 95.0 |
| Example 6 | PP | ○ | 1.0 | ○ | 0.3 | ○ | 2.0 | 3.0 | 97.0 |
| Example 7 | PE | ○ | 1.0 | ○ | 0.3 | ○ | 2.0 | 2.0 | 98.0 |
| Example 8 | PP | ○ | 2.0 | ○ | 0.2 | ○ | 2.7 | 2.0 | 98.0 |
| Example 9 | PE | ○ | 2.0 | ○ | 0.2 | ○ | 2.7 | 2.0 | 98.0 |
| Example 10 | PP | ○ | 1.0 | ○ | 0.2 | ○ | 1.0 | 5.0 | 95.0 |
| Example 11 | PE | ○ | 1.0 | ○ | 0.2 | ○ | 1.0 | 2.0 | 98.0 |

Examination of Resin Film

Example 12

A film was formed using the PP pellets of Example 1.
PP was melt-extruded at a T-die temperature of 200° C.
The discharged film was directed to a cooling roll at 90° C.

and cooled by blowing cold air at 37.2° C. Then, the film was taken out at 40 m/min. The thickness of the obtained unstretched polypropylene film was 8.1 μm.

Regarding the obtained PP film, magnetic foreign matter was examined using an AC gauss meter, and the average area in which the magnetic foreign matter was detected was 71 mm$^2$/m$^2$.

Comparative Example 61

A film was obtained in the same manner as in Example 12, except that the PP pellets of Comparative Example 2 was used. Regarding the obtained PP film, magnetic foreign matter was examined using an AC gauss meter, and the average area in which the magnetic foreign matter was detected was 232 mm$^2$/m$^2$.

Example 13

A film was formed using the PE pellets of Example 2.

PE was melt-extruded at a T-die temperature of 173° C. The discharged film was directed to a cooling roll at 115° C. and cooled by blowing cold air at 39° C. Then, the film was taken out at 20 m/min. The thickness of the obtained unstretched polyethylene film was 9.4 μm.

Regarding the obtained PE film, magnetic foreign matter was examined using an AC gauss meter, and the average area in which the magnetic foreign matter was detected was 66 mm$^2$/m$^2$.

Comparative Example 71

A film was obtained in the same manner as in Example 12, except that the PE pellets of Comparative Example 4 was used. Regarding the obtained PE film, magnetic foreign matter was examined using an AC gauss meter, and the average area in which the magnetic foreign matter was detected was 139 mm$^2$/m$^2$.

The following Table 2 collectively shows the results of Examples 12 and 13 and Comparative Examples 6 and 7.

TABLE 2

| | | Example 12 | Comparative Example 6 | Example 13 | Comparative Example 7 |
|---|---|---|---|---|---|
| Resin | | PP | PP | PE | PE |
| Thickness (μm) | | 8.1 | 8.1 | 9.4 | 9.4 |
| Area in which Magnetic Foreign Matter is Detected (mm$^2$/m$^2$) | N1 | 22 | 356 | 17 | 105 |
| | N2 | 153 | 148 | 52 | 239 |
| | N3 | 62 | 30 | 109 | 121 |
| | N4 | 30 | 50 | 71 | 151 |
| | N5 | 91 | 577 | 82 | 78 |
| | ave. | 71 | 232 | 66 | 139 |
| Area in which Magnetic Foreign Matter is Detected in Terms of a Thickness of 10 μm (mm$^2$/m$^2$/10 μm) | | 88 | 287 | 70 | 148 |

Example 141

The PP film of Example 12 and the PE film of Example 13 were subjected to thermal compression bonding, and then heated and stretched to produce a separator film for an electric storage device formed of a fine porous film having a three-layer structure of PP/PE/PP. The properties of the produced separator film are collectively shown in Table 3. Regarding the obtained separator film, magnetic foreign matter was examined using an AC gauss meter, and the average area in which the magnetic foreign matter was detected was 110 mm$^2$/m$^2$.

Comparative Example 8

The PP film of Comparative Example 6 and the PE film of Comparative Example 7 were subjected to thermal compression bonding, and then a separator film for an electric storage device formed of a fine porous film having a three-layer structure of PP/PE/PP was produced in the same manner as in Example 14. Regarding the obtained separator film, magnetic foreign matter was examined using an AC gauss meter, and the average area in which the magnetic foreign matter was detected was 186 mm$^2$/m$^2$.

Example 15

A separator having a thickness of approximately 12 μm was produced in the same manner as in Example 14, except that the thicknesses of the PP film (Example 12) and the PE film (Example 13) were adjusted.

Example 16

A separator having a thickness of approximately 16 μm was produced in the same manner as in Example 14, except for the PP film (Example 12) and the PE film (Example 13).

Example 17

A separator having a thickness of approximately 25 μm was produced in the same manner as in Example 14, except for the PP film (Example 12) and the PE film (Example 13).

Example 18

A separator having a thickness of approximately 30 μm was produced in the same manner as in Example 14, except for the PP film (Example 12) and the PE film (Example 13).

Example 19

A separator having a thickness of approximately 40 μm was produced in the same manner as in Example 14, except for the PP film (Example 12) and the PE film (Example 13).

Table 3 collectively shows the results of Examples 14 to 19 and Comparative Example 8.

TABLE 3

| | Example 14 | Comparative Example 8 | Example 15 | Example 16 | Example 17 | Example 18 | Example 19 |
|---|---|---|---|---|---|---|---|
| Thickness (μm) | 21.0 | 20.7 | 12.4 | 16.5 | 25.1 | 30.3 | 40.6 |
| Gurley (sec/100 cc) | 384 | 394 | 157 | 273 | 531 | 520 | 612 |

TABLE 3-continued

|  | Example 14 | Comparative Example 8 | Example 15 | Example 16 | Example 17 | Example 18 | Example 19 |
|---|---|---|---|---|---|---|---|
| Shrinkage Rate in TD (%) | −0.11 | −0.14 | −0.11 | −0.14 | −0.11 | −0.25 | −0.11 |
| Maximum Pore Diameter (μm) | 0.10 | 0.10 | 0.12 | 0.09 | 0.09 | 0.13 | 0.10 |
| Average Area in which Magnetic Foreign Matter is Detected (mm$^2$/m$^2$) | 110 | 192 | 97 | 112 | 160 | 234 | 281 |
| Area in which Magnetic Material is Detected in Terms of a Thickness of 20 μm (mm$^2$/m$^2$/20 μm) | 105 | 186 | 156 | 136 | 127 | 154 | 138 |

REFERENCE SIGNS LIST

10, 11, 12, 110: sorting device
2, 102: transport path
2A: trough (first transport path)
2B: transport pipe (second transport path)
2C: slope (third transport path)
3: resin pellet
4, 104: first magnet
6, 106: ionizer (destaticizer)
7: magnetic adsorption region
8, 108: second magnet
20, 120: raw material hopper
30: temporary storage hopper
102A: first region
102B: second region
102C: third region

What is claimed is:

1. A method of sorting resin pellets, comprising:
supplying a resin granule mass comprising a plurality of resin granules with positive ions or negative ions to destaticize the resin granules; and
adsorbing magnetic foreign matter included in the resin granule mass by a magnetic field to remove the magnetic foreign matter therefrom,
wherein the magnetic foreign matter is magnetized before removing the magnetic foreign matter by the adsorbing magnet, and
wherein the method is performed using a sorting device, the sorting device comprising:
a transport path which is configured to transport resin granules;
a destaticizer which is disposed along the transport path and which supplies ions to the transport path to destaticize the resin granules;
an adsorption magnet which is disposed along the transport path on a downstream side of the destaticizer and which forms a magnetic field in the transport path to adsorb the magnetic foreign matter; and
a magnetization magnet which is disposed along the transport path on an upstream side than the adsorption magnet and which forms a magnetic field in the transport path to magnetize the magnetic foreign matter included in the resin granules,
wherein a wind pressure of air containing ions supplied from the destaticizer in the sorting device is 0.2 MPa or more and 0.3 MPa or less,
the magnetization magnet has a magnetic flux density of 1.0 tesla or more, and
a magnetic flux density of the adsorption magnet is greater than a magnetic flux density of the magnetization magnet.

2. The sorting method according to claim 1, wherein the resin granule mass that is destaticized is transported on a plane, and uniformly forms the magnetic field in the width direction perpendicular to a transport direction.

3. The sorting method according to claim 1, wherein a polyolefin resin that is extruded in the form of a strand or a rod is cut by a cutting device to produce the resin granule mass.

4. The sorting method according to claim 3, wherein the polyolefin resin is a polyethylene resin or a polypropylene resin.

5. The sorting method according to claim 1, wherein a magnet with a surface magnetic flux density of 1.0 tesla or more is used to remove the magnetic foreign matter.

6. The sorting method according to claim 5, wherein a magnet with a surface magnetic flux density of gauss 1.5 tesla or more is used when removing the magnetic foreign matter.

7. The sorting method o according to claim 1, wherein the magnetic foreign matter is a magnetic foreign matter adhering to or mixed in the resin granule.

8. The sorting method according to claim 1, wherein the magnetization magnet is disposed above a trough, the magnetization in the magnetic foreign matter is directed along a specific direction, and the magnetic foreign matter is magnetized.

9. The sorting method according to claim 1, wherein a longitudinal direction of the magnetization magnet is matched with a direction perpendicular to the transport direction, and the magnetization magnet is opposed to the trough.

10. The sorting method according to claim 2, wherein a polyolefin resin that is extruded in the form of a strand or a rod is cut by a cutting device to produce the resin granule mass.

11. The sorting method according to claim 1, wherein the magnetic foreign matter is magnetized before destaticizing the resin granules by the destaticizer.

* * * * *